(12) United States Patent
Rickert et al.

(10) Patent No.: US 11,187,118 B2
(45) Date of Patent: Nov. 30, 2021

(54) CHARGE CHANGING CONTROL DEVICE, RECIPROCATING ENGINE AND METHOD FOR OPERATING A CHARGE CHANGING CONTROL DEVICE

(71) Applicant: Caterpillar Motoren GmbH & Co. KG, Kiel (DE)

(72) Inventors: Carsten Rickert, Kiel (DE); Eike Sixel, Kiel (DE); Pay Brodersen, Kiel (DE); Heiner Otte, Kiel (DE)

(73) Assignee: Caterpillar Motoren GmbH & Co. KG, Kiel (DE)

( * ) Notice: Subject to any disclaimer, the term of this patent is extended or adjusted under 35 U.S.C. 154(b) by 0 days.

(21) Appl. No.: 16/856,265

(22) Filed: Apr. 23, 2020

(65) Prior Publication Data

US 2020/0355098 A1 Nov. 12, 2020

(30) Foreign Application Priority Data

May 6, 2019 (GB) ..................................... 1906365

(51) Int. Cl.
*F01L 1/24* (2006.01)
*F02D 1/16* (2006.01)
*F02D 13/02* (2006.01)
*F01L 13/00* (2006.01)
*F01L 1/047* (2006.01)
*F16H 53/06* (2006.01)

(52) U.S. Cl.
CPC ............... *F01L 13/00* (2013.01); *F01L 1/047* (2013.01); *F01L 1/24* (2013.01); *F02D 1/162* (2013.01); *F02D 13/0215* (2013.01); *F01L 2013/111* (2013.01); *F02D 2200/024* (2013.01); *F02D 2200/06* (2013.01); *F02D 2200/101* (2013.01); *F16H 53/06* (2013.01)

(58) Field of Classification Search
CPC ... F01L 13/00; F01L 1/047; F01L 1/24; F01L 2013/111; F02D 1/162; F02D 13/0215; F02D 2200/024; F02D 2200/06; F02D 2200/101; F16H 53/06
USPC ....................................................... 123/90.16
See application file for complete search history.

(56) References Cited

U.S. PATENT DOCUMENTS

| 3,641,988 A | 2/1972 | Torazza et al. | |
| 4,723,515 A | 2/1988 | Burandt | |
| 5,365,895 A * | 11/1994 | Riley | F01L 1/024 |
| | | | 123/90.16 |

(Continued)

FOREIGN PATENT DOCUMENTS

| EP | 2136054 A1 | 12/2009 |
| EP | 2803829 A | 11/2014 |

(Continued)

OTHER PUBLICATIONS

Search Report for related United Kingdom Application No. 1906365.0; report dated Oct. 21, 2019.

*Primary Examiner* — Mahmoud Gimie (57) ABSTRACT

The present invention refers to a charge changing control device for a reciprocating engine, comprising at least one cam follower configured for being pivotably actuated around a pivot axis (P) upon rotational movement of a camshaft, and an adjustment unit configured for setting at least three different charge-changing modes of the device by translationally displacing the pivot axis relative (P) to a rotational axis (R) of the camshaft.

20 Claims, 3 Drawing Sheets

(56) References Cited

U.S. PATENT DOCUMENTS

| | | | |
|---|---|---|---|
| 5,456,224 A * | 10/1995 | Riley | ................ F02D 13/0257 |
| | | | 123/90.16 |
| 7,600,418 B2 | 10/2009 | Okamoto | |
| 9,719,447 B2 | 8/2017 | Sixel et al. | |
| 2006/0260575 A1* | 11/2006 | Buelna | ................ F01L 1/181 |
| | | | 123/90.16 |
| 2007/0215082 A1* | 9/2007 | Kido | ................ F01L 13/0005 |
| | | | 123/90.16 |
| 2007/0227481 A1* | 10/2007 | Kido | ................ F01L 1/181 |
| | | | 123/90.16 |
| 2008/0115762 A1* | 5/2008 | Hiraku | ................ F02D 13/08 |
| | | | 123/339.14 |
| 2010/0131173 A1 | 5/2010 | Willi | |
| 2012/0227694 A1* | 9/2012 | Frickmann | ........ F01L 13/0015 |
| | | | 123/90.16 |
| 2013/0276731 A1* | 10/2013 | Yano | ................ F01L 1/356 |
| | | | 123/90.15 |

FOREIGN PATENT DOCUMENTS

| | | |
|---|---|---|
| EP | 2677142 B1 | 2/2015 |
| EP | 2998553 B1 | 5/2018 |
| EP | 3431740 A1 | 1/2019 |
| JP | H05163915 A | 6/1993 |
| WO | WO 83/01483 | 4/1983 |
| WO | 2008049890 A1 | 5/2008 |
| WO | 2012048309 A1 | 4/2012 |

\* cited by examiner

CHARGE CHANGING CONTROL DEVICE, RECIPROCATING ENGINE AND METHOD FOR OPERATING A CHARGE CHANGING CONTROL DEVICE

CROSS-REFERENCE TO RELATED APPLICATION

This application claims priority under 35 USC § 119 and the Paris Convention to United Kingdom Patent Application No. 1906365.0 filed on May 6, 2019.

TECHNICAL FIELD

The present invention refers to a charge changing control device for a reciprocating engine, a reciprocating engine comprising a charge changing control device, and a method for operating a charge changing control device.

TECHNOLOGICAL BACKGROUND

Reciprocating engines, such as dual fuel engines, are known which use natural gas or bio-gas as an energy source for combustion. Such gaseous fuels, i.e. fuels which under normal conditions are in a gaseous state, typically comprise a blend of different hydrocarbons such as methane and higher hydrocarbons as well as inert gases.

The composition of the gaseous fuel may vary during operation of the reciprocating engine. Variations of the gas composition, however, may change the energy content of the gaseous fuel, for example, by varying amounts of higher hydrocarbons. As a result, the reciprocating engine may be operated with gaseous fuel of varying energy content which may affect the operation of the internal combustion engine. For example, such variations may cause knocking of the engine or misfire in the combustion chamber of the engine during operation.

In general, reciprocating engines may be particularly prone to knocking and misfire during ramp-up or ramp-down operation, i.e. during operating states in which the engine's load is significantly increased or decreased, e.g. from zero to full load, and vice versa. This applies particularly for dual fuel engines when being operated in a gas mode.

For preventing the occurrence of knocking and misfire, it is known to equip reciprocating engines with a charge changing control device configured to change valve actuation timings during operation of the engine. Specifically, the known charge changing control devices may be operated in two different charge-changing modes, i.e. one intended for being set during a low load range and the other for a high load range of the engine. For example, during ramp-up or ramp-down operation of the engine, the known charge changing control device changes the valve timings at a pre-defined load to prevent the engine from being subjected to misfire in the low load range and from knocking in the high load range.

A charge changing control device configured for switching between two charge-changing modes having different valve actuation timings is known, for example, from EP 2 136 054 A1.

The approach of providing two different charge-changing modes may ensure proper operation of the engine for a predefined operational mode and for a predefined fuel property and quality, e.g. for a gaseous fuel having a methane number greater than 75. However, when the fuel to be combusted varies during operation, i.e. in view of its composition or quality, the two different charge-changing modes may no longer ensure a proper or optimized operation of the engine. For example, if the methane number of a gaseous fuel to be combusted is not sufficiently high, i.e. is less than 75, an operating window in a middle load range may exist, in which neither one of the two available charge-changing modes may ensure proper operation of the engine.

SUMMARY OF THE INVENTION

Starting from the prior art, it is an objective to provide an improved charge changing control device for use in a reciprocating engine which is capable of ensuring proper operation of the engine among different operating conditions, i.e. by effectively preventing the engine from being subjected to knocking or misfire during operation. In addition, it is an objective to provide a reciprocating engine equipped with such a charge changing control device and a method for operating such a charge changing control device.

This objective is solved by means of a charge changing control device having the features of claim 1, a reciprocating engine having the features of claim 14 and a method having the features of claim 15. Preferred embodiments are set forth in the present specification, the Figures as well as the dependent claims.

Accordingly, a charge changing control device for a reciprocating engine is provided, comprising at least one cam follower configured for being pivotably actuated around a pivot axis upon rotational movement of a camshaft, and an adjustment unit configured for setting at least three different charge-changing modes of the device by displacing the pivot axis relative to a rotational axis of the camshaft.

Furthermore, a reciprocating engine, in particular a dual fuel engine, is provided which is equipped with such a charge changing control device.

Since the reciprocating engine is equipped with the above described charge changing control device, technical features which are described in connection with the charge changing control device in the present disclosure may also relate and be applied to the proposed reciprocating engine, and vice versa.

To that end, a method for operating a charge changing control device in a reciprocating engine is provided. The charge changing control device has at least one cam follower configured for being pivotably actuated around a pivot axis upon rotational movement of a camshaft. The method comprises the step of switching the device among at least three different charge-changing modes by displacing the pivot axis relative to a rotational axis of the camshaft.

The proposed method may particularly be provided for operating a charge changing control device as described above. Accordingly, technical features which are described in connection with the above charge changing control device and the above reciprocating engine in the present disclosure may also relate and be applied to the proposed method, and vice versa.

BRIEF DESCRIPTION OF THE DRAWINGS

The present disclosure will be more readily appreciated by reference to the following detailed description when being considered in connection with the accompanying drawings in which.

DETAILED DESCRIPTION

In the following, the invention will be explained in more detail with reference to the accompanying Figures. In the Figures, like elements are denoted by identical reference numerals and repeated description thereof may be omitted in order to avoid redundancies.

Figure 1:
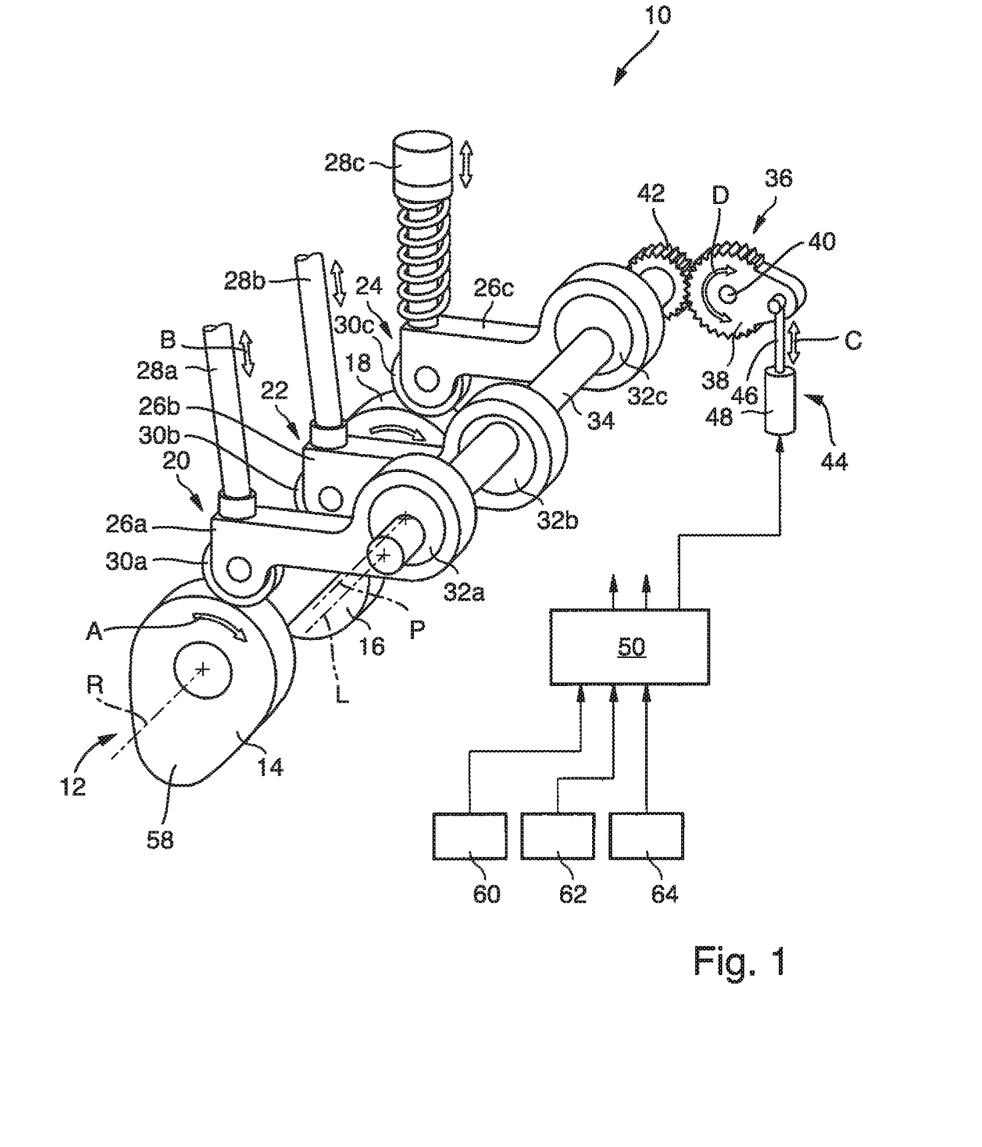
FIG. 1 schematically shows a perspective view of a charge changing control device installed in a reciprocating engine.

In FIG. 1, a charge changing control device 10, also referred to as the device, is depicted which is installed in a reciprocating engine, in particular a dual fuel engine, using natural gas or bio-gas as an energy source for combustion. Specifically, FIG. 1 shows a perspective view of a section of the engine depicting the device 10 which is mechanically coupled to and actuated by a camshaft 12 of the engine. The shown device 10 and the camshaft 12 are associated to one cylinder of the engine and are configured to control charge changing, i.e. medium exchange, in a combustion chamber of the cylinder during operation of the engine. Specifically, for doing so, the device 10 together with the camshaft 12 is configured for controlling actuation of an intake valve, an outtake valve and a fuel pump or gas valve associated to the one cylinder of the engine.

The engine may comprise more than one cylinder, each of which may be associated to a different intake valve, outtake valve, gas valve and fuel pump which are actuated by a corresponding charge changing control device.

The camshaft 12 is coupled to a crankshaft (not shown) of the engine in a torque-transmitting manner. In this way, upon rotating the crankshaft, the camshaft 12 is rotated around a rotational axis R as indicated by arrow A in FIG. 1. The camshaft 12 is equipped with a plurality of cams 14-18, each of which is configured to actuate one medium exchange component of the engine, i.e. the intake valve, the outtake valve or the fuel pump, via a corresponding cam follower assembly 20-24 of the device 10. With such a configuration, a stroke of the cams 14-18 is transmitted to the medium exchange components to control their actuation, i.e. their actuation timing, during an operating cycle of a piston accommodated in the cylinder.

In this way, the device 10 and the camshaft 12 are configured for controlling actuation of the intake valve, the outtake valve and the fuel pump according to a camshaft-angle depending timing pattern. In other words, by this configuration, the intake valve, the outtake valve and the fuel pump are actuated in dependence on a camshaft angle. In other words, since the camshaft is mechanically coupled to the crankshaft of the engine, the intake valve, the outtake valve and the fuel pump are actuated in dependence on a crankshaft angle and thus in dependence on a stroke of a piston which reciprocates within the associated cylinder of the engine.

More specifically, the camshaft 12 comprises an intake valve cam 14 for controlling operation of the engine's intake valve. The intake valve cam 14 is mechanically coupled to a first cam follower assembly 20, also referred to as an intake valve cam follower assembly, having a first cam follower 26a and a first operating lifter 28a. The first cam follower 26a is configured to trace or follow the stroke of the intake valve cam 14 via a first roll 30a. The first roll 30 is rotationally mounted to the first cam follower 26a, i.e. at a first end portion thereof, and supported on a circumferential shell surface of the intake valve cam 14. With such a configuration, the stroke of the intake valve cam 14 is translated and transmitted into a reciprocating movement of the first cam follower 26a.

Specifically, the first cam follower 26a is configured for being pivotably actuated around a pivot axis P upon rotational movement of the camshaft 12. In other words, in the shown configuration, a rotational movement of the camshaft 12 and the associated cam 14 around the rotational axis R is transmitted into a pivoting or swilling movement of the first cam follower 26a around the pivot axis P, as indicated by arrow B in FIG. 1. The pivot axis P is arranged spaced apart from and parallel to the rotational axis R.

For being pivotable around the pivot axis P, the first cam follower 26a, is rotationally mounted on a first eccentric disc 32a at a second end portion arranged opposed to the first end portion thereof. The first eccentric disc 32a has a circular cylindrical circumferential surface and is rotationally symmetric to the pivot axis P. The first eccentric disc 32a is firmly fixed to, i.e. formed integrally with, an eccentric shaft 34. In this configuration, the pivot axis P is arranged spaced apart from and parallel to a longitudinal axis L of the eccentric shaft 34.

At the first end portion of the first cam follower 26a, the first operating lifter 28a is provided, via which the stroke of the intake valve cam 14 is further transmitted to the intake valve for controlling its actuation timing during operation of the camshaft 12.

Furthermore, the camshaft 12 comprises an outtake valve cam 16 for controlling actuation of the engine's outtake valve. The outtake valve cam 16 is mechanically coupled to a second cam follower assembly 22, also referred to as an outtake valve cam follower assembly. The configuration and function of the second cam follower assembly 22 corresponds to that one of the first cam follower assembly 20. Accordingly, the second cam follower assembly 22 comprises a second cam follower 26b, a second operating lifter 28b, a second roll 30b and a second eccentric disc 32b. Further, the second cam follower assembly 22 is provided such that, upon rotational movement of the camshaft 12, a stroke of the outtake valve cam 16 is transmitted into a pivoting movement of the second cam follower 26b and the second operating lifter 28b which causes actuation of the engine's outtake valve.

Compared to the first eccentric disc 32a of the first cam follower assembly 20, the second eccentric disc 32b of the second cam follower assembly 22 is displaced such that a pivot axis of the second cam follower assembly 22 is arranged spaced apart and parallel to the pivot axis P of the first cam follower assembly 20. In an alternative embodiment, the pivot axis of the second cam follower assembly 22 may coincide with the pivot axis P of the first cam follower assembly 20. Further, in the shown configuration, the pivot axis of the second cam follower assembly 22 is arranged spaced apart from and parallel to the longitudinal axis L of the eccentric shaft 34.

Furthermore, the camshaft comprises a fuel pump cam 18 for controlling operation of the engine's fuel pump. The fuel pump cam 18 is mechanically coupled to a third cam follower assembly 24, also referred to as a fuel pump cam follower assembly. The configuration and function of the third cam follower assembly 24 corresponds to that one of the first or the second cam follower assembly 20, 22.

Accordingly, the third cam follower assembly 24 comprises a third cam follower 26c, a third operating lifter 28c, a third roll 30c and a third eccentric disc 32c.

The third cam follower assembly 24 is provided such that, upon rotational movement of the camshaft 12, a stroke of the fuel pump cam 18 is transmitted into a pivoting movement of the third cam follower 26c and the third operating lifter 28c which causes actuation of the fuel pump.

Compared to the first and the second eccentric disc 32a,b, the third eccentric disc 32c of the third cam follower assembly 24 is displaced such that a pivot axis of the third cam follower assembly 22 is arranged spaced apart and parallel to the pivot axis of each one of the first and the second cam follower assembly 20, 22. In an alternative embodiment, the pivot axis of the third cam follower assembly 24 may coincide with the pivot axis of at least one of the first and the second cam follower assembly 20, 22. In the shown configuration, the pivot axis of the third cam follower assembly 24 is arranged spaced apart from and parallel to the longitudinal axis L of the eccentric shaft 34.

In the shown configuration, the eccentricities of the first to third eccentric discs 32a-c relative to one another and relative to the longitudinal axis L of the eccentric shaft 34 may be selected individually according to the respective requirements of the engine. In an alternative configuration, for example, the pivot axis of maximum two of the three cam follower assemblies 20-24 may coincide with the longitudinal axis of the eccentric shaft 34. Further, the pivot axis of at least two cam follower assemblies 20-24 may coincide.

Furthermore, the device 10 comprises an adjustment unit 36 which is configured to set at least three different charge-changing modes of the device 10. In the context of the present disclosure, the term "charge-changing mode" refers to an operating mode of the device 10, in which the device 10 can be continuously operated, i.e. for a desired period of time, during operation of the engine. Further, the adjustment unit 36 enables that the device 10 can be switched between the different charge-changing modes during operation of the engine.

Figure 2:
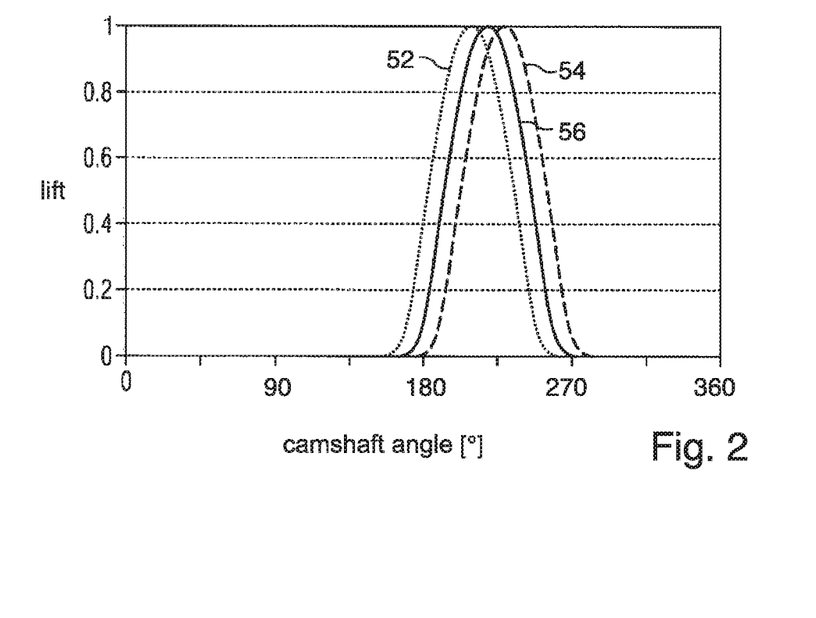
FIG. 2 shows a schematic diagram illustrating a camshaft-angle-dependent actuation timing of a cam follower comprised in the device depicted in FIG. 1.

Specifically, the proposed device 10 is provided such that a camshaft-angle-dependent timing pattern of medium exchange in the combustion chamber of the engine's cylinder differs among the different charge-changing modes. In the context of the present disclosure, the term "camshaft-angle-depending timing pattern" generally refers to a correlation between the actuation and lifting of at least one cam follower assembly 20-24 and the camshaft angle or the stroke of the piston which reciprocates in the cylinder. In other words, by a camshaft-angle-depending timing pattern, the actuation or lifting of at least one cam follower 20-24 may be expressed or defined as a function of the camshaft angle. In the shown configuration, the camshaft-angle-depending timing pattern defines an actuation timing of the intake valve, e.g. as depicted in FIG. 2, the outtake valve and the fuel pump within an operating cycle of the cylinder as a function of the camshaft angle.

Specifically, for setting the different charge-changing modes of the device 10, the adjustment unit 36 is configured to adapt an actuation timing of the gas exchange components by changing the structural arrangement of each one of the cam follower 26a-c relative to the camshaft 12. More specifically, the adjustment unit 36 is configured to selectively displace the pivot axis of each one of the cam follower assemblies 20-24 relative to the rotational axis R of the camshaft 12.

For doing so, the adjustment unit 36 is configured to rotatably actuate the eccentric shaft 34 around its longitudinal axis L. Accordingly, the adjustment unit 36 is mechanically coupled to the eccentric shaft 34 in a torque transmitting manner. The structural configuration of the adjustment unit 36 is described in the following under reference to FIG. 1.

The adjustment unit 36 comprises a segmental gear wheel 38 which is rotationally mounted on a support pin 40 firmly coupled to a housing of the engine. The segmental gear wheel 38 is engaged with and designed complementary to a further gear wheel 42 firmly fixed to an end portion of the eccentric shaft 34. Specifically, the segmental gear wheel 38, along a section of its circumferential surface, is provided with gear teeth designed complementary to further gear teeth of the further gear wheel 42 which are arranged circumferentially around the longitudinal axis L the eccentric shaft 34.

The adjustment unit 36 further comprises an actuator 44 coupled to the gear wheel 38 and configured to rotationally actuate the gear wheel 38 around the support pin 42. The actuator 44 is a linear actuator provided in the form of a piston/cylinder unit. Accordingly, the actuator 44 comprises a piston 46 which can be reciprocatingly actuated within a cylinder 48 so as to be moved, i.e. retracted or protruded, relative to the cylinder 48, as indicated by arrow C in FIG. 1. The actuator 44 and the segmental gear wheel 38 are coupled such that a linear actuation of the actuator's piston 46 is translated into a rotational movement of the segmental gear wheel 38 around the support pin 40. Thus, upon translationally actuating the actuator 44, the segmental gear wheel 42 is rotationally activated around the support pin 40 which, due to the mechanical coupling between the eccentric shaft 34 and the segmental gear wheel 42, causes a rotational actuation of the eccentric shaft 34 around its longitudinal axis L.

In other words, the actuator 44 is configured to adjust a rotational position of the eccentric shaft 34, i.e. relative to the housing of the engine, and thus to adjust a position of the eccentric discs 34 relative to the longitudinal axis L of the eccentric shaft 34.

A middle axis of the eccentric discs 32a-c, which corresponds to the pivot axis of the corresponding cam follower assembly 20-24, does not coincide with the longitudinal axis of the eccentric shaft 34. As a result, upon rotationally displacing the eccentric shaft 34 around its longitudinal axis L, the pivot axis of each one of the cam follower 26a-c is translationally displaced relative to the rotational axis R of the camshaft 12. In this way, the adjustment unit 36 is configured to translationally displace the pivot axis of the first to third cam follower 26a-c relative to the rotational axis R of the camshaft 12 by rotationally actuating the eccentric shaft 34.

The adjustment unit 36 further comprises a control unit 50 for controlling actuation of the actuator 44. Specifically, the control unit 50 is configured to set the adjustment unit 36, i.e. its actuator 44, into different defined positions, each of which is associated to one corresponding charge-changing mode of the device 10.

In the following, the effect of actuating the actuator 44 and thus of translationally displacing the pivot axes of the cam follower assemblies 20-24 on their actuating timings is exemplarily described under reference to FIG. 2.

FIG. 2 shows a diagram illustrating a camshaft-angle-dependent actuation timing of the first cam follower assembly 20. However, the following features described in connection with FIG. 2 are not limited to the first cam follower assembly 20. Rather, those features may also be applied to any one of the other cam follower assemblies 22, 24 and its corresponding components.

In FIG. 2, the abscissa of the diagram depicts a camshaft angle between 0° and 360° and the ordinate of the diagram depicts the associated normalized lift of the first cam follower assembly 20. Specifically, the lift indicated by the ordinate refers to the stroke movement of the first lift operator 28a which causes a proportional opening or lift of the intake valve. Specifically, a value of 0 for the lift indicates that the intake valve is fully closed, and a value of 1 indicates that the valve is fully opened.

In FIG. 2, three different actuation timing curves 52-56 are depicted, each of which is associated to a different setting or position of the adjustment unit 36. Each setting of the adjustment unit 36 is defined by a respective position of the actuator 44, i.e. of its piston 46 relative to its cylinder 48, and accordingly by a respective rotational position of the eccentric shaft 34.

As set forth above, by switching the adjustment unit 36 into one of the three different settings or positions, each of which is associated to one of the three curves 52-56 depicted in FIG. 2, the device 10 can be operated in at least three different charge-changing modes 10. In other words, the adjustment unit 36, i.e. upon actuating the actuator 44, is configured for setting at least three different charge-changing modes of the device 10.

Specifically, a first curve 52, which is depicted by a dotted line in FIG. 2, illustrates an actuation timing of the first cam follower 20 according to a first charge-changing mode of the device 10. In the first charge-changing mode, the adjustment unit 36, i.e. the piston 46 of the actuator 44, is positioned in a first end position, in which the piston 46 is fully retracted. In other words, the actuator 44 is not configured to retract its piston 46 beyond the first end position.

A second curve 54, which is depicted by a dashed line in FIG. 2, illustrates an actuation timing of the first cam follower 20 according to a second charge-changing mode of the device 10. In the second charge-changing mode, the adjustment unit 36, i.e. the piston 46 of the actuator 44 is positioned in a second end position, in which the piston 46 is fully protruded. In other words, the actuator 44 is not configured to protrude its piston 46 beyond the second end position.

A third curve 56, which is depicted by a solid line in FIG. 2, illustrates an actuation timing of the first cam follower 20 according to a third charge-changing mode of the device 10. In the third charge-changing mode, the adjustment unit 36, i.e. the piston 46 of the actuator 44, is positioned in an intermediate position between the first end position and the second end position. In this intermediate position, the piston 46 of the actuator 44 is arranged in a position between the fully retracted and the fully protruded position.

When the adjustment unit 36 is positioned in its first end position, the first cam follower 26a is arranged relative to the eccentric shaft 34 such that a distance between the pivot axis P of the first cam follower 26a and the rotational axis R of the camshaft 12 is minimal compared to a state, in which the adjustment unit 36 is positioned in its intermediate position or its second end position. As a result, compared to the state, in which the adjustment unit 36 is positioned in its intermediate position or its second end position, the first cam follower 26a is displaced relative to the intake valve cam 14 along its circumferential surface in a direction being opposed to the rotational direction indicated by arrow A in FIG. 1. Accordingly, during actuation of the camshaft 12, a radially extending protrusion 58 of the intake valve cam 14 gets earlier into contact with the first roll 30a when the adjustment unit 36 is positioned in its first end position compared to the state in which it is in the intermediate or the second end position. In other words, in the first charge-changing mode, the first cam follower 26a is earlier actuated within an operating cycle of the camshaft 12 compared to a state, in which the device 10 is in its second or third charge-changing mode. As a result, the first curve 52 associated to the first end position depicted in FIG. 2 is shifted leftwards compared to the second curve 54 and the third curve 56 associated to the second end position and the intermediate position of the adjustment unit 36.

As set forth above, the actuation timing in the different positions of the adjustment unit 36 depends on the eccentricities and position of the corresponding eccentric discs 32a-c relative to the eccentric shaft 34. In other words, the actuation timing in the different positions of the adjustment unit 36 are set by the structural configuration and arrangement of the corresponding eccentric disc 32a-c relative to the eccentric shaft 34. In another configuration of the device, for example, the first eccentric disc 32a and the eccentric shaft 34 may be provided such that the first curve 52 depicted in FIG. 2 may be associated to the intermediate position or the second end position, wherein the second curve 54 may accordingly be associated to the first end position or the intermediate position, and wherein the third curve 56 may accordingly be associated to the second end position or the first end position.

Although being described in connection with the first cam follower assembly 20, the actuation timings depicted in FIG. 2 may likewise illustrate the actuation timings of the second or third cam follower assembly 22, 24 for the different positions of the adjustment unit 36. However, the device 10 is preferably provided such that, when the adjustment unit 36 is positioned in any one of its predefined positions, the actuation timings of the respective cam follower assemblies 20-24 are shifted relative to one another in the corresponding camshaft-angle-dependent timing pattern.

In the shown configuration, the adjustment unit 36 is configured to be set into at least three different positions. For example, the adjustment unit 36 may be configured to be set in five or more different positions, each of which being associated to a different charge-changing mode of the device 10. For doing so, the adjustment unit 36 may be positioned into a plurality of different intermediate positions.

Further, the adjustment unit 36 may be configured such that it may be set in any position, i.e. intermediate position, between the first and the second end position. In this way, the adjustment unit 36 allows to continuously and/or gradually switch the device 10 between the first charge-changing mode associated to the first end position and the second charge-changing mode associated to the second end position of the adjustment unit 36.

For setting the different charge-changing modes, the adjustment unit 36 is equipped with the control unit 50 which controls actuation of the actuator 44. The actuator 44 is a pneumatic actuator which is designed and configured to position its piston 46 into a desired position which is determined or stipulated by the control unit 50. In other words, the adjustment unit 36 is pneumatically driven. For doing so, the actuator 44 may comprise two adjustable chambers for receiving a pressurized medium which are configured to exert opposed actuating forces onto the piston 46 so as to selectively move or hold the piston 46 relative to the cylinder 48. The adjustable chambers may be equipped with valves controlled by the actuator 44 for selectively supplying or removing the pressurized medium into or from the different chambers so as to actuate the piston 46. Based on the desired position, the actuator 44 may be configured to control the actuation of the piston 46 by means of a closed loop control. In this configuration, the actuator 44 may comprise a means for determining a position of the piston 46 to get a feedback of its actual position and, based on a comparison with the desired position, to actuate the piston 46.

Alternatively, the actuator 44 may be a hydraulically or electrically driven actuator or may be of any other configuration suitable for selectively actuating the eccentric shaft 34.

The proposed device 10 is configured to set the different charge-changing modes so as to adjust the actuation timings of at least one of the first to third cam follower assembly 20-24 within an operating cycle of the cylinder. For doing so, the 36 of the device 10 is configured for variably shifting the actuation timing of at least one cam follower assembly 20-24 within an operating cycle of the camshaft 12.

In the following, it is described how the device is operated during operation of the engine. In other words, a method for operating the device 10 is described.

The device 10 is configured to set the different charge-changing modes based on an engine's operating condition and based on a property of the fuel to be combusted in the cylinder. Further, the device 10 may be configured to set the different charge-changing modes based on environmental influences such as an ambient temperature, a height and a humidity of an environment in which the engine is operated.

Accordingly, for taking into account the above described parameters, the control unit 50 of the adjustment unit 36 is configured to receive at least one operating parameter being indicative of the engine's operating condition. In other words, the device 10 is configured for setting the different charge-changing modes as a function of the at least one operating parameter.

Specifically, the at least one operating parameter may include at least one of an operating load of the engine, an engine power and an engine speed. These parameters may be transmitted to the control unit 50 from an engine control system 60, as depicted in FIG. 1.

Further, the at least one operating parameter may include at least one of a pressure prevailing in the combustion chamber, a charge air pressure and an exhaust gas temperature. In this context, the exhaust gas temperature may refer to a temperature of exhaust gas downstream of the outlet valve or at a turbine inlet of the engine. In order to provide those parameters to the control unit 50, the adjustment unit may further comprise at least one monitoring unit 62 configured to determine at least one of a cylinder pressure prevailing in the engine's combustion chamber, in particular a time-dependent course of the pressure, a charge air pressure and an exhaust gas temperature.

Further, the at least one operating parameter may include a knocking characteristic. Generally, the term "knocking" refers to an unfavorable combustion behavior which occurs when combustion of some of the air/fuel mixture in the cylinder does not result from propagation of a flame front ignited by a spark plug, but rather explode outside the envelope of the normal combustion front. Typically, the fuel-air charge is meant to be ignited by the spark plug only, and at a precise point in the piston's stroke. Knocking occurs when the peak of the combustion process no longer occurs at the optimum moment. In this way, shock waves are created which induce a sudden increase in the cylinder pressure. Accordingly, based on the determined cylinder pressure, a knocking characteristic may be determined. As set forth above, the control unit 50 may be configured to receive the determined cylinder pressure from the monitoring unit 62. Based on this input, the control unit 50 may be configured to calculate the knocking characteristic, e.g. a knock intensity, indicating how frequently knocking occurs during operation of the engine.

Alternatively or additionally, the device may be configured for setting the different charge-changing modes as a function of at least one fuel parameter being indicative of the property of fuel to be combusted. The at least one fuel parameter may include or be indicative of at least one of a fuel composition, a methane number and a lower heating value of the fuel to be combusted. For taking into account these parameters, the control unit 50 of the adjustment unit 36 is configured to receive the at least one fuel parameter from a fuel analysis unit 64, as depicted in FIG. 1.

The fuel analysis unit 64 may be provided in the form of a measuring unit configured to measure the fuel parameter. Alternatively or additionally, the fuel analysis unit 64 may be configured to determine the at least one fuel parameter as a function of the at least one operating parameter by means of a mathematical model, a mathematical function or a characteristic diagram. For example, the fuel analysis unit 64 may be configured to calculate a fuel parameter being indicative of the fuel composition and/or the methane number based on the cylinder pressure determined by the monitoring unit 62 and/or based on the engine load determined by the engine control system 60 based on a mathematical model, a mathematical function or a characteristic diagram.

Specifically, the shown device 10 is configured to switch the charge-changing mode when at least one operating parameter or at least one fuel parameter has reached a predefined threshold value. For doing so, the control unit 50 of the adjustment unit 36 may be configured to switch the charge-changing mode of the device 10 when the determined knocking characteristic and/or the determined exhaust gas temperature and/or the determined cylinder pressure has reached a predefined threshold value.

Figure 3:
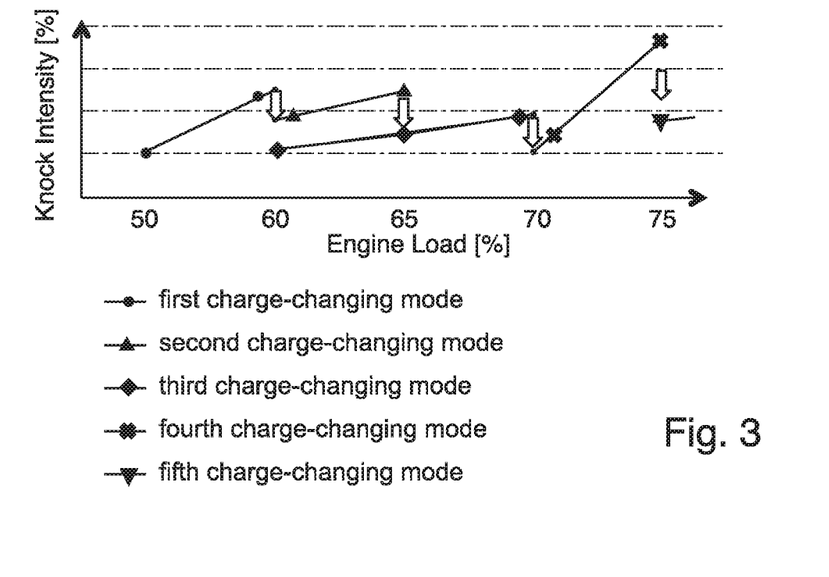
FIG. 3 shows a first diagram illustrating a ramp-up operation of the engine equipped with the device 10 depicted in FIG. 1.
Figure 4:
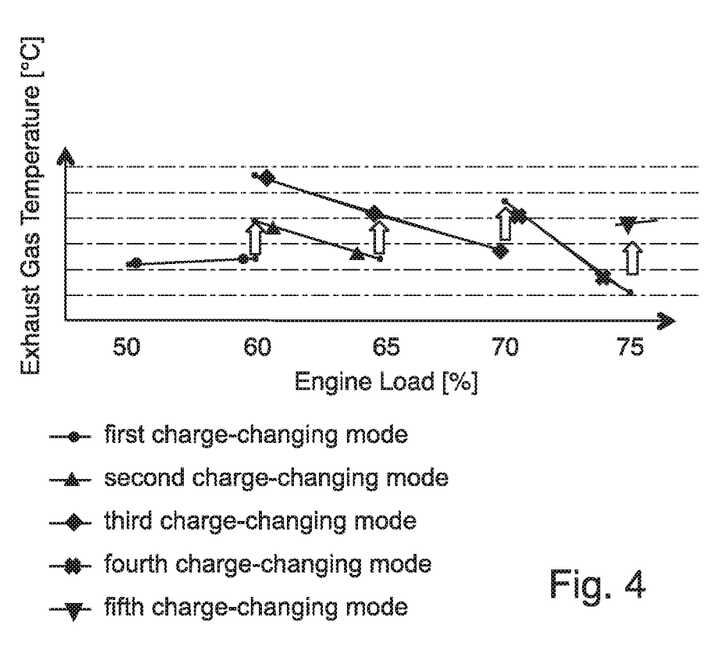
FIG. 4 shows a second diagram illustrating a ramp-up operation of the engine equipped with the device 10 depicted in FIG. 1.

FIGS. 3 and 4 illustrate a ramp-up operation of the engine equipped with the device 10 depicted in FIG. 1, during which device is successively operated in different charge-changing modes.

Specifically, in the diagram depicted in FIG. 3, the abscissa shows an engine load of the engine and the ordinate shows a knock intensity determined during operation of the engine. During the ramp-up operation of the engine, the device 10 is successively operated in a first to fifth charge-changing mode. In FIGS. 3 and 4, a switch between successive charge-changing modes is indicated by an arrow, respectively. In the diagram depicted in FIG. 3, the effects of switching the device among its different charge-changing modes on the knock intensity are illustrated. By switching the device 10 among its different charge-changing modes, the proposed device 10 prevents that, during ramp-up or ramp-down operation of the engine, the engine is subjected to an unfavorable high knock intensity which may cause damage of the engine.

In the diagram depicted in FIG. 4, the abscissa shows the engine load of the engine and the ordinate shows the exhaust gas temperature. The shown diagram illustrates the effect of switching the device 10 among its different charge-changing modes on the exhaust gas temperature. As can be gathered from FIG. 4, by switching the device 10 among its different charge-changing modes, the proposed device 10 ensures that, during ramp-up or ramp-down operation of the engine, the exhaust gas temperature lies within a desired range, i.e. does not exceed an upper or lower threshold value.

By providing more than two different charge-changing modes, the proposed device 10 may ensure proper operation of the engine even when the fuel to be combusted varies during operation or has a methane number lower than 75. In this way, the device 10 may provide charge-changing modes which are optimized for a middle load range, i.e. during ramp-up or ramp-down operation, in which the charge-changing modes of known charge changing control devices may not ensure proper operation of the engine, i.e. may not prevent the engine from being subjected to knocking or misfire.

It will be obvious for a person skilled in the art that these embodiments and items only depict examples of a plurality of possibilities. Hence, the embodiments shown here should not be understood to form a limitation of these features and configurations. Any possible combination and configuration of the described features can be chosen according to the scope of the invention.

A charge changing control device for a reciprocating engine may be provided. The charge changing control device, also referred to as the device, may comprise at least one cam follower configured for being pivotably actuated around a pivot axis upon rotational movement of a camshaft. The device may further comprise an adjustment unit configured for setting at least three different charge-changing modes of the device by displacing, i.e. translationally displacing, the pivot axis of the cam follower relative to a rotation axis of the camshaft.

In general, the proposed charge changing control device is intended for being used in a reciprocating engine, such as a dual fuel engine, a bi-fuel engine or a diesel engine. Such engines typically comprise more than one cylinder and accordingly may be equipped with a corresponding number of charge changing control devices, each of which is associated to one cylinder.

Specifically, the proposed charge changing control device may be used for controlling charge changing, i.e. medium exchange, in a combustion chamber of one cylinder of the engine. Accordingly, the proposed device may be configured for selectively actuate different medium exchange components of the engine associated to the cylinder, such as an intake valve, an outtake valve, a gas valve and a fuel pump, in dependence on a movement of the camshaft, i.e. as a function of a camshaft angle. Thus, the at least one cam follower of the device may be configured for controlling actuation of at least one of an intake valve, an outtake valve, a gas valve and a fuel pump of the engine.

A set forth above, the device is configured for being set in at least three different charge-changing modes. By this configuration, compared to known charge-changing devices which can be switched between only two charge-changing modes, the proposed solution provides an increased degree of control over actuation timing of medium exchange controlled by the camshaft. In other words, the device allows to more variably adjust actuation timings, thereby enabling that the engine may be operated in an optimized manner for a wide range of different operating conditions, i.e. during ramp-up or ramp-down operations and/or when being operated with fuel of varying energy content. In this way, the proposed device enables to effectively prevent an engine from being subjected to knocking or misfire during operation.

Preferably, the device is provided such that a camshaft-angle-dependent timing pattern of medium exchange in the combustion chamber of the engine differs among the three charge-changing modes. For doing so, the camshaft-angle-dependent timing pattern may define an actuation timing of at least one of an intake valve, an outtake valve, a gas valve and a fuel pump as a function of a camshaft angle. For example, the camshaft-angle-dependent timing pattern may define an actuation timing of each one of the intake valve, the outtake valve and fuel on during an operating cycle of the cylinder as a function of the camshaft angle.

A set forth above, the adjustment unit of the proposed device is configured for setting at least three different charge changing modes of the device by displacing the pivot axis of the cam follower relative to the rotational axis of the camshaft. In other words, upon displacing the pivot axis of the cam follower relative to the rotational axis of the camshaft, the adjustment unit may be configured to switch the device among its different charge-changing modes. In this configuration, a position of the pivot axis of the cam follower relative to the rotational axis of the camshaft may be associated to one of the at least three charge-changing modes. In other words, each charge-changing mode may be determined by a predefined relative position between the pivot axis of the cam follower and the rotational axis of the camshaft.

The adjustment unit may be mechanically coupled to the cam follower such that an actuation of the adjustment unit causes a displacement of the pivot axis of the cam follower. Specifically, the adjustment unit may be activated so as to be positioned into at least three different settings or positions, each of which is associated to a proper position of the pivot axis of the cam follower and thus to a proper charge-changing mode of the device. For example, the adjustment unit may be positioned in a first end position, in a second end position and in at least one intermediate position disposed between the first and the second end position. In a further development, the adjustment unit may be configured to be positioned in any position between the first and a second end position.

Specifically, the device may be provided such that, in a first mode of the at least three charge-changing modes, the adjustment unit is positioned in the first end position. In a second mode of the at least three charge-changing modes, the adjustment unit may be positioned in the second end position. Further, in a third mode of the at least three charge-changing modes, the adjustment unit may be positioned in the intermediate position.

Further, the adjustment unit may be configured to, during operation of the engine, gradually or continuously shift the adjustment unit's position between the first and a second end position so as to gradually or continuously shift among different charge-changing modes.

The cam follower of the device may be configured to trace or follow the stroke of a cam provided on the camshaft so as to transmit an actuation lift to a medium exchange component associated to the cam follower. For doing so, a roll may be rotationally mounted on an end portion of the cam follower which, in a mounted state of the device, is guided along a circumferential surface of the cam. With such a configuration, the stroke of the cam is translated and transmitted into a reciprocating movement of the cam follower around its pivot axis.

In a further development, the cam follower may be mechanically coupled to the adjustment unit by means of an eccentric shaft being provided with an eccentric disc. Specifically, the eccentric disc may be firmly fixed to the eccentric shaft or may be integrally formed with the eccentric shaft such that a middle axis of the eccentric disc is arranged spaced apart from and parallel to a longitudinal axis of the eccentric shaft. The cam follower may be rotationally mounted on the eccentric disc such that the pivot axis of the cam follower coincides with the middle axis of the eccentric disc. In this configuration, the adjustment unit may be configured to rotationally actuate the eccentric shaft around its longitudinal axis so as to translationally displace the pivot axis of the cam follower relative to the rotational axis of the camshaft. For doing so, the adjustment unit may be pneumatically driven. Alternatively or additionally, the adjustment unit may be electrically or hydraulically driven.

In a further development, in order to appropriately set the different charge-changing modes, the device may be configured to set the different charge-changing modes based on at least one of an engine's operating condition and a property of fuel to be combusted in the engine. In this way, actuation timing of the medium exchange components may be selectively set based on an actual operating condition of the engine and/or a fuel property. Alternatively or additionally, the device may be configured to set the different charge-changing modes based on environmental influences such as an ambient temperature, a height and a humidity of an environment in which the engine is operated.

Specifically, the device may be configured for setting the different charge-changing modes as a function of at least one operating parameter being indicative of the engine's operating condition and including at least one of an operating load of the engine, an engine power, an engine speed, a knocking characteristic, an exhaust gas temperature, a pressure prevailing in the combustion chamber, and a charge air pressure.

Alternatively or additionally, the device may be configured for setting the different charge-changing modes as a function of at least one fuel parameter being indicative of the fuel property and including at least one of a fuel composition, a methane number and a lower heating value of the fuel to be combusted. For example, the device may be configured to determine the fuel property as a function of at least one of the operating parameter, in particular by means of a mathematical model, a mathematical function or a characteristic diagram.

In a further development, the device may be configured to switch the charge-changing mode of the device when at least one operating parameter or at least one fuel parameter has reached a predefined threshold value. For example, the device may be configured to switch the charge-changing mode of the device when a knocking characteristic, in particular a knock intensity, and/or an exhaust gas temperature has reached a predefined threshold value.

Furthermore, a reciprocating engine, in particular a dual fuel engine, may be provided which is equipped with a charge changing control device as described above.

To that end, a method may be provided in a reciprocating engine having at least one cam follower configured for being pivotably actuated around a pivot axis upon rotational movement of a camshaft. The method may comprise the step of switching the device among at least three different charge-changing modes by translationally displacing the pivot axis relative to a rotational axis of the camshaft.

INDUSTRIAL APPLICABILITY

With reference to the Figures, a charge changing control device 10 for use in a reciprocating engine is suggested. The charge changing control device 10 as mentioned above is applicable in any reciprocating engine and especially in dual fuel engines which are operated either by gaseous or liquid fuel. The suggested charge changing control device 10 may replace conventional charge changing control devices and may serve as a replacement or retrofit part.

What is claimed is:

1. A charge changing control device for a reciprocating engine, comprising at least one cam follower configured for being pivotably actuated around a pivot axis (P) upon rotational movement of a camshaft, and an adjustment unit configured for setting at least three different charge-changing modes of the device by translationally displacing the pivot axis (P) of the at least one cam follower relative to a rotational axis (R) of the camshaft,
wherein the device is configured to switch the charge changing mode when at least one fuel parameter being indicative of a property of fuel to be combusted has reached a predefined threshold.

2. The device according to claim 1, wherein the at least one cam follower is configured for controlling actuation of at least one of an intake valve, an outtake valve, a gas valve and a fuel pump of the engine.

3. The device according to claim 1, wherein a camshaft-angle-dependent timing pattern of medium exchange in a combustion chamber of the engine differs among the three charge-changing modes.

4. The device according to claim 3, wherein the camshaft-angle-dependent timing pattern defines an actuation timing of at least one of an intake valve, an outtake vale, a gas valve and a fuel pump as a function of a camshaft angle.

5. The device according to claim 1, wherein in a first mode of the three charge-changing modes, the adjustment unit is positioned in a first end position, wherein
in a second mode of the three charge-changing modes, the adjustment unit is positioned in a second end position, and wherein
in a third mode of the three charge-changing modes, the adjustment unit is positioned in an intermediate position between the first and the second end position.

6. The device according to claim 5, wherein the adjustment unit is configured to, during operation of the engine, gradually or continuously shift the adjustment unit's position between the first end position and the second end position so as to gradually or continuously shift among different charge-changing modes.

7. The device according to claim 1, wherein the adjustment unit is pneumatically driven.

8. The device according to claim 1, which is configured for setting the different charge-changing modes based on at least one of an engine's operating condition and the property of fuel to be combusted in the engine.

9. The device according claim 1, which is configured for setting the different charge-changing modes as a function of at least one operating parameter being indicative of the engine's operating condition and including at least one of an operating load of the engine, an engine power, an engine speed, a knock characteristic, an exhaust gas temperature, a pressure prevailing in the combustion chamber, and a charge air pressure.

10. The device according to claim 1, which the at least one fuel parameter includes at least one of a fuel composition, a methane number and a lower heating value of the fuel to be combusted.

11. The device according to claim 9, which is configured to determine the fuel parameter as a function of at least one of the operating parameter, in particular by means of a mathematical model, a mathematical function or a characteristic diagram.

12. The device according to claim 9, which is configured to switch the charge-changing mode of the device when at least one operating parameter or the at least one fuel parameter has reached a predefined threshold value.

13. The device according to claim 8, which is configured to switch the charge-changing mode of the device when a knocking characteristic, in particular a knocking intensity, or an exhaust gas temperature has reached a predefined threshold value.

14. A reciprocating engine equipped with a charge changing control device according to claim 1.

15. A method for operating a charge changing control device in a reciprocating engine having at least one cam follower configured for being pivotably actuated around a pivot axis (P) upon rotational movement of a camshaft, the method comprises the step of switching the device among at least three different charge-changing modes by translationally displacing the pivot axis (P) of the at least one cam follower relative to a rotational axis (R) of the camshaft, wherein the device is configured to switch the charge changing mode when at least one fuel parameter being indicative of a property of fuel to be combusted has reached a predefined threshold.

16. A charge changing control device for a reciprocating engine, comprising at least one cam follower configured for being pivotably actuated around a pivot axis (P) upon rotational movement of a camshaft, and an adjustment unit configured for setting at least three different charge-changing modes of the device by translationally displacing the pivot axis (P) of the at least one cam follower relative to a rotational axis (R) of the camshaft, wherein the device is configured to set the different charge-changing modes as a function of a knocking characteristic or an exhaust gas temperature of the engine such that the device switches a charge-changing mode when the knocking characteristic or the exhaust gas temperature has reached a predefined threshold value.

17. The device according to claim 16, in which the exhaust gas temperature is a fuel parameter being indicative of a property of fuel to be combusted.

18. The device of claim 17, in which the device further includes a fuel analysis unit configured to measure the fuel parameter.

19. The device of claim 17, in which the knocking characteristic is an operating parameter being indicative of the engine's operating condition.

20. The device of claim 19, which is configured to switch the charge-changing mode of the device when the operating parameter or the fuel parameter has reached a predefined threshold.

* * * * *